United States Patent [19]

Smitley

[11] 4,342,371
[45] Aug. 3, 1982

[54] VEHICULAR ENERGY STORING MEANS AND SYSTEM

[75] Inventor: Marion L. Smitley, Birmingham, Mich.

[73] Assignee: Colt Industries Operating Corp, New York, N.Y.

[21] Appl. No.: 31,311

[22] Filed: Apr. 18, 1979

Related U.S. Application Data

[63] Continuation of Ser. No. 796,754, May 13, 1977, abandoned.

[51] Int. Cl.³ .............................................. B60K 9/04
[52] U.S. Cl. ..................................... 180/165; 74/572; 192/0.094; 192/48.4; 192/48.9
[58] Field of Search ............ 180/165, 54 R; 192/3 R, 192/4 A, 0.055, 0.072, 0.094, 48.4, 48.9; 60/413, 414; 74/751, 572

[56] References Cited

U.S. PATENT DOCUMENTS

| | | | |
|---|---|---|---|
| 2,656,733 | 10/1953 | Dicke | 180/165 |
| 2,803,151 | 8/1957 | Clerk | 180/165 |
| 3,665,788 | 5/1972 | Nyman | 180/165 |
| 3,749,194 | 7/1973 | Bardwick | 180/165 |
| 3,882,950 | 5/1975 | Strohlein | 180/165 |
| 3,886,810 | 6/1975 | Sugiyama | 180/165 |
| 3,910,043 | 10/1975 | Clerk | 60/414 |
| 4,106,605 | 8/1978 | Winchell | 192/48.4 |

Primary Examiner—David M. Mitchell
Attorney, Agent, or Firm—Walter Potoroka, Sr.

[57] ABSTRACT

A rotatable flywheel is selectively operatively connectable to the power drive train of a related vehicle and is effective to absorb energy from the vehicular ground-engaging drive wheels during vehicle deceleration thereby also providing for at least a degree of vehicular braking; a clutch is provided to enable the vehicular ground-engaging drive wheels to accelerate the flywheel while preventing the flywheel from driving such wheels through such clutch; an additional clutch is shown as being provided to enable selectively variable degrees of operative connection between the wheels and flywheel; and a related control is provided for affecting such selectively variable degrees of operative connection.

16 Claims, 3 Drawing Figures

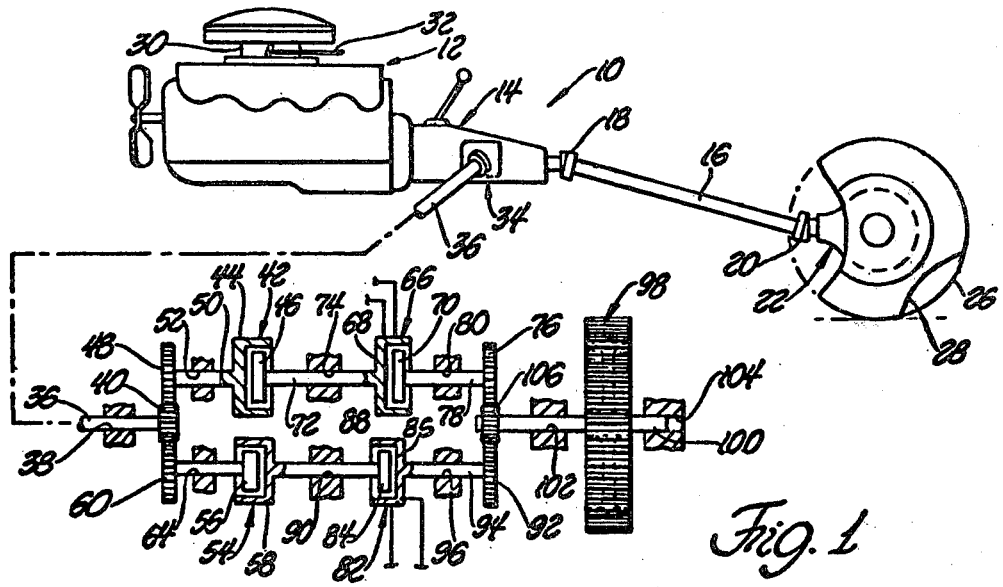
Fig. 1
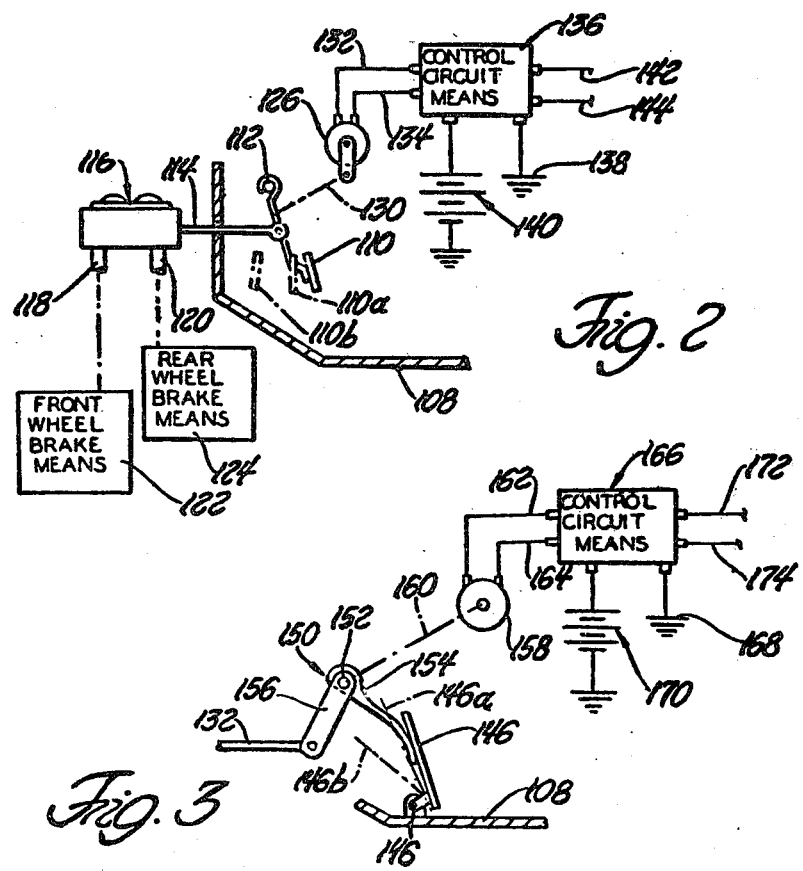
Fig. 2
Fig. 3

4,342,371

VEHICULAR ENERGY STORING MEANS AND SYSTEM

This is a continuation, of application Ser. No. 796,754, filed May 13, 1977 and now abandoned.

BACKGROUND OF THE INVENTION

It has generally been realized by the prior art that the use of flywheels in automotive type vehicles could reduce vehicular fuel consumption and also reduce the level of atmospheric pollutants arising from vehicle exhaust emissions. Heretofore the prior art has proposed the use of a flywheel within mostly mass transit type of vehicles, usually referred to as buses, wherein the flywheel was operated generally in combination with an electric motor-generator. That is, for example, in one particular prior art embodiment, the vehicle (a bus) drew electric current as from overhead wires to operate an electric motor-generator which, in turn, was connected to a flywheel situated under the floor of the bus. When the motor-generator had the flywheel rotating at approximately 3,000 r.p.m. the bus operator would break contact with the overhead wires and the electric motor would start to function as a generator and would be driven by the rotating flywheel. The generator thusly driven would supply electrical energy to conventional electric drive motors situated at the vehicle drive wheels. In this arrangement, it can be seen that the flywheel was employed purely as a storage or reservoir for the sole power for propelling the vehicle. Unfortunately, the energy thusly stored was sufficient to propel the vehicle less than a mile before the flywheel had to again be driven up to 3,000 r.p.m., or designated speed by use of overhead wires and the associated motor-generator. A most impractical use of the flywheel in attempting to conserve energy.

The prior art is again suggesting the adoption of a like system with the further improvement of providing regenerative braking. That is, as the bus or trolly descends a hill, upon application of the brakes, means are provided for employing the flywheel as part of the braking force thereby transferring such part of the braking energy back into the flywheel. It is estimated that in such a system two-thirds of the energy required to ascend a hill will be recouped during the descent thereof. Unfortunately, the system is still one where the flywheel becomes the sole reservoir of energy for propelling the vehicle and at regular intervals requires regeneration as from overhead electrical wires or the like.

None of the prior art approaches to the use of flywheels has been shown to be acceptable especially for use in automotive vehicles of the passenger type or the like.

Accordingly, the invention as herein disclosed and described is primarily directed to the solution of the above shortcomings and problems of the prior art as well as to the practical adaptation of flywheel as an energy storing device for automotive type vehicles.

SUMMARY OF THE INVENTION

According to the invention, an energy storing and supplying system for a vehicle having a prime mover and surface-engaging vehicular propelling wheel means, comprises vehicular primary power transmitting means operatively interconnecting said prime mover and said wheel means, flywheel means, and secondary power transmitting means operatively connected to said prime mover and to said flywheel means, said secondary power transmitting means being effective during a first condition of operation of said vehicle for transmitting energy from said vehicle and into said flywheel means as to thereby impact rotation to said flywheel means, said secondary power transmitting means being effective during a second condition of operation of said vehicle for transmitting energy from said flywheel during its rotation and into said wheel means as to at least assist in propelling said vehicle.

Various general and specific objects and advantages of the invention will become apparent when reference is made to the following detailed description considered in conjuction with the accompanying drawings.

BRIEF DESCRIPTION OF THE DRAWINGS

In the drawings wherein for purposes of clarity certain details and/or elements may be omitted from one or more views.

FIG. 1 is a somewhat simplified view of an automotive vehicle equipped with flywheel means according to teachings of the invention;

FIG. 2 is a somewhat simplified view of a related portion of the associated vehicle illustrating related control components; and FIG. 3 is a somewhat simplified view of another related portion of the associated vehicle illustrating other related control components.

DETAILED DESCRIPTION OF THE PREFERRED EMBODIMENT

Referring now in greater detail to the drawings; FIG. 1 illustrates a vehicle 10 comprising a combustion engine 12 supplying power through a related transmission assembly 14 (which may be of the variable speed gear type) drive shaft 16 with front and rear universal joint assemblies 18 and 20, differential gearing assembly 22, drive axle means 24 and ground-engaging vehicle drive wheels 26 and 28. The engine 12 may be provided with any suitable motive fluid induction means 30 and any suitable throttle valve means which is operatively connected as to related throttle control linkage means a portion of which is illustrated at 32.

Suitable power take-off means 34, such as that, for example, employed in four-wheel-drive vehicles, serves to transmit power from the transmission means 14 along shaft 36, journalled as at 38, to a gear 40.

First over-running clutch assembly means 42, many suitable and specific types of which are well known in the art, comprises first clutch member means 44 and second clutch member means 46 which are, under a particular condition of operation, rotatable relative to each other while under a second condition of operation form a drive train therebetween. The first clutch member means 44 is rotatably fixedly connected to a gear 48 as through a shaft 50 journalled as at 52.

Second over-running clutch assembly means 54 similarly comprises first clutch member means 56 and second clutch member means 58 which are, under a first particular condition of operation, rotatable relative to each other while under a second condition of operation form a drive train therebetween. The first clutch member means 56 is rotatably fixedly connected to a gear 60 as through a shaft 62 journalled as at 64.

First magnetic clutch assembly means 66, many suitable and specific types of which are well known in the art, is illustrated as comprising first magnetic clutch member means 68 and second magnetic clutch member means 70 which, as is generally well known in the art, depending upon the degree of electrical energization thereof will be, in varying degrees, rotatable with respect to each other and under certain circumstances even form a direct drive train therethrough. The first magnetic clutch member means 68 is rotatably fixedly connected to the second clutch member means 46, of first over-running clutch assembly 42, as through a shaft 72 journalled as at 74. The second magnetic clutch member means 70 is rotatably fixedly connected to a gear 76 as through a shaft 78 journalled as at 80.

Second magnetic clutch assembly means 82 similarly comprises first magnetic clutch member means 84 and second magnetic clutch member means 86 which, as is generally well known in the art, depending upon the degree of electrical energization thereof will be, in varying degrees rotatable with respect to each other and under certain circumstances even form a direct drive train therethrough. The first magnetic clutch member means 84 is rotatably fixedly connected to the second clutch member means 58, of second over-running clutch assembly 54, as through a shaft 88 journalled as at 90. The second magnetic clutch member means 86 is rotatably fixedly connected to a gear 92 as through a shaft 94 journalled as at 96.

A flywheel 98 is rotatably fixedly secured to a shaft 100, journalled as at 102 and 104, which, in turn, is fixedly secured to a gear 106 which is in meshed engagement with gears 76 and 92.

In FIG. 2 a portion of the vehicular floor pan is illustrated at 108 with a operator-actuated vehicle brake system pedal or lever 110 pivotally supported as at 112. As is generally well known in the art, the brake pedal 110 is operatively connected as through related linkage means 114 to associated vehicular master brake cylinder means 116, also well known in the art. Suitable related hydraulic conduit means 118 and 120 communicating with the master cylinder assembly 116 may lead respectively to the vehicular front wheel braking means 122 and rear wheel braking means 124.

A potentiometer 126 is operatively connected as by related motion transmitting means 130 to brake pedal means 110 as to be adjustable in relation to the movement of such brake pedal 110. The potentiometer 126 is connected as by conductors 132 and 134 to related electrical control circuit means 136 which is shown as being electrically connected to a related source of electrical potential 140. Related electrical conductor means 142 and 144 serve to electrically interconnect control circuit means 136 with the magnetic clutch assembly means 66.

FIG. 3 illustrates the vehicular throttle valve operator foot-operated pedal or lever 146, pivotally secured as at 148, to the vehicle floor pan 108. A related bellcrank assembly 150, comprising a journalled shaft 152 and levers 154, 156, has its lever 154 in operative engagement with throttle foot pedal 146 while lever 156 is operatively connected to throttle valve actuating linkage.

A potentiometer 158 is operatively connected as to bellcrank shaft 152 by related motion transmitting means 160 in order to thereby be adjustable in relation to the rotation of bellcrank means 150 and consequently the movement, in the throttle opening direction, of throttle foot pedal 146. Electrical conductor means 162 and 164 serve to interconnect potentiometer means 158 with related electrical control circuit means 166 which is shown as being electrically grounded as at 168 and electrically connected to a related source of electrical potential 170. Electrical conductor means 172 and 174 serve to electrically interconnect control circuit means 166 with the magnetic clutch assembly means 82. It is, of course, conceivable that sources of electrical potential 140 and 170 may actually be one and the same and it is also conceivable that the control means generally separately indicated at 136 and 166 may actually be combined as to define a single identifiable control circuit means providing the functions ascribed to both.

OPERATION OF THE INVENTION

Generally, as can be seen and in view of the preceding description, vehicular drive wheels 26, 28 and power take-off shaft means 36 are operatively interconnected so that the speed of rotation of shaft 36 is related to the speed of rotation of main drive shaft 16 and the rotation of wheels 26 and 28. In other words, with the vehicle 10 in motion gear 40 will be rotated at some speed related to the speed of drive shaft 16 and generally related to the speed of the vehicle 10 with such relationship being somewhat modified during turning movements of the vehicle 10 because of the action of differential gearing assembly 22.

As a consequence of gear 40 rotating whenever the vehicle 10 is in motion, gears 48 and 60, engaged therewith, are also in motion thereby causing shafts 50 and 62 and clutch member means 44 and 56 to also rotate.

The first over-running or one-way clutch assembly means 42 is so arranged as to be effective for transmitting power from vehicle drive wheels 26, 28 (through shaft 16 and take-off shaft means 36) to the flywheel 98. In other words, the clutch assembly 42 functions in its over-running mode whenever the flywheel 98 should attempt to transmit power from itself to the vehicle drive wheels 26, 28. This then means that shaft 72 is able to rotate at speeds greater than shaft 50.

The second over-running or one-way clutch assembly means 54 is so arranged as to be effective for transmitting power from the flywheel 98 (through gears 60, 40 shaft 36, transmission 14 and drive shaft 16) to vehicle drive wheels 26 and 28. In other words, the clutch assembly 54 functions in its over-running mode whenever the drive wheels 26, 28 should attempt to transmit power from themselves to the flywheel. This then means that the engine 12 is able to drive shaft 62 at a rotational speed faster than the speed at which flywheel 98 drives shaft 88.

From the preceding it can be seen that the invention thus far described provides two general paths by which power or energy can be transmitted to and from the flywheel 98. That is, a first power train exists by which power or energy can be transmitted to flywheel 98 with such power train comprising either engine 12 and transmission 14 or drive wheels 26, 28, drive shaft 16, transmission 14 and power take-off shaft means 36, gear 40, gear 48, shaft 52, one-way clutch assembly 42, shaft 72, magnetic clutch assembly 66, shaft 78, gear 76, gear 106 and shaft 100. A second power train by which the flow of power or energy is reversed, that is, from flywheel 98 to the engine 12 and/or drive wheels 26, 28 comprises shaft 100, gear 106, gear 92, shaft 94, magnetic clutch assembly 82, shaft 88, one-way clutch assembly 54, shaft 62, gear 60, gear 40, shaft means 36, transmission 14 and either engine 12 or drive shaft 16 and wheels 26, 28.

The magnetic clutch means 66 and 82 are employable for varying the degree of torque (power or energy) to be transmitted therethrough. That is, as generally depicted and broadly disclosed, the vehicular brake pedal 110 is operatively electrically connected to magnetic (or electro-magnetic) clutch assembly means 66. Accordingly, let it be assumed that during normal or gradual deceleration (without application or energization of the associated vehicular braking system) clutch means 66 is sufficiently energized to transmit full power from shaft 72 to shaft 78. During such decleration, of course, energy is transmitted from the drive wheels 26, 28 to the flywheel 98 which, at that time, serves as a braking force.

Further, the potentiometer 126 and related circuit means 136 may be so adjusted as to exhibit varying degrees of actuation of the clutch means 66. For example, such could be arranged so that as brake pedal 110 is moved from its position shown to that position depicted in phantom line at 110a, the degree of energization of clutch means 66 could progressively diminish from 100% to 0%. This, in turn, would mean that there would be progressively greater "slippage" through such clutch means 66 thereby progressively reducing the amount of power being transmitted from the declerating vehicle to the flywheel 98. The position of the brake pedal 110 depicted at 110b could correspond to a maximum energization of the associated vehicle brake system. In any event, the potentiometer means 126, circuit means 136 and clutch means 66 provide an overall means whereby the operator still can exhibit full control over the vehicle and make full use of the associated vehicular braking system should a faster deceleration be desired that that which the flywheel is capable of providing and to provide for decelerating or stopping the vehicle below the speed at which the gear ratio of the flywheel is capable of handling as described above. The flywheel (due to feeding energy into it) assists the vehicle braking system within its design capability. As should be apparent, with the system of the invention, the flywheel 98 will continue rotating, in a free mode, even while the vehicle is stopped and standing still.

The energy thusly stored in the flywheel 98, as described, can then be employed for moving or accelerating the associated vehicle. Such as accomplished through the power train previously described and comprising clutch assembly means 54 and 82.

For example, let it be assumed that the vehicle is standing still and that the flywheel 98 is rotating because of the energy previously transmitted thereto. Also, at this time let it be assumed that throttle operating foot-lever 146 is in its position shown in FIG. 3. (Even though lever 146 is referred to as being operatively connected to throttle means it should be apparent that the expression, throttle, or, throttle means, is meant to encompass any device, structure or means for controlling either: (a) the rate of motive fluid supplied to the engine or prime mover 12 or (b) the rate of electrical energy being supplied to any prime mover or motor functionally equivalent to engine 12.)

Now let it be assumed that it is desired to either place the vehicle in motion (or to accelerate it). As the throttle pedal 146 is depressed to the position generally depicted at 146a, the potentiometer means 158 and circuit means 166 become effective for progressively energizing magnetic (or electromagnetic) clutch assembly means 82 whereby such clutch assembly means 82 become progressively more effective for progressively transmitting an increasing amount of power or torque therethrough as to thereby enable flywheel 98 to gradually and smoothly transmit power or energy from itself to gear 60, shaft means 36 and engine 12 and drive wheels 26, 28. The position of pedal 146 depicted at 146b could correspond to a wide open throttle or maximum engine load condition. Again as described above the flywheel (with its stored energy) will assist the engine to the limit of its capability in accelerating the vehicle.

In view of the preceding, it can be seen that the invention provides flywheel energy recovering means effective for storing therein energy obtained as during decleration of the associated vehicle and effective for, in turn, supplying such stored energy back to the associated vehicle's primary drive train in order to thereby assist in the propelling of such vehicle Although only a preferred embodiment of the invention has been disclosed and described it should be apparent that other embodiments and modifications of the invention are possible within the scope of the appended claims.

I claim:

1. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said secondary power transmitting means comprising a first secondary drive train and a second secondary drive train in parallel operating relationship to each other and being effective during a first condition of operation of said vehicle for transmitting energy from said vehicle drive wheel means through only one of said drive trains and into said flywheel as to thereby impart rotation to said flywheel, said secondary power transmitting means also being effective during a second condition of operation of said vehicle for transmitting energy from said flywheel during its rotation through only the other of said drive trains and into said drive wheel means as to at least assist in propelling said vehicle.

2. An energy storing and supplying system according to claim 1, and further comprising operator positionable brake actuating means for actuating vehicular brake system means associated with said vehicle, and control means operated in response to the positioning of said brake actuating means, said control means being effective to at times permit only a portion of the energy available from said vehicle drive wheel means to be transmitted from said drive wheel means to said flywheel.

3. An energy storing and supplying system according to claim 1, and further comprising operator positionable throttle actuating means for variably determining the position of throttle means associated with said prime mover, and control means operated in response to the positioning of said throttle means, said control means being effective to at times permit only a portion of the energy available from said flywheel to be transmitted to said drive wheel means.

4. An energy storing and supplying system according to claim 1, and further comprising operator positionable brake actuating means for actuating vehicular brake system means associated with said vehicle, first control means operated in response to the positioning of said brake actuating means, said first control means being effective to at times permit only a portion of the energy available from said vehicle drive wheel means to be transmitted to said flywheel, operator positionable throttle-actuating means for variably determining the position of throttle means associated with said prime mover, and second control means operated in response to the positioning of said throttle means, said second control means being effective to at times permit only a portion of the energy available from said flywheel to be transmitted to said drive wheel means.

5. An energy storing and supplying system according to claim 1 wherein said secondary power transmitting means comprises a first secondary drive train and a second secondary drive train in mechanically parallel relationship to each other, said first secondary drive train comprising first clutch means effective for preventing the transmission of a working torque therethrough except in a first direction of transmission, and said second secondary drive train comprising second clutch means effective for preventing the transmission of a working torque therethrough except in a second direction of transmission opposite to said first direction.

6. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said secondary power transmitting means being effective during a first condition of operation of said vehicle for transmitting energy from said vehicle drive wheel means and into said flywheel as to thereby impart rotation to said flywheel, said secondary power transmitting means being effective during a second condition of operation of said vehicle for transmitting energy from said flywheel during its rotation and into said drive wheel means as to at least assist in propelling said vehicle, said secondary power transmitting means comprising a first secondary drive train and a second secondary drive train in mechanically parallel relationship to each other, said first secondary drive train comprising first and second clutch means, said first clutch means being effective for preventing the transmission of a working torque therethrough except in a first direction of transmission, and said second clutch means being effective to vary the magnitude of said working torque transmitted through said first clutch means in said first direction.

7. An energy storing and supplying system for a vehicle having a prime mover and surface-engaging vehicular propelling drive wheel means, comprising vehicular primary power transmitting means operatively interconnecting said prime mover transmitting means operatively connected to said drive wheel means and to said flywheel, said secondary power transmitting means being effective during a first condition of operation of said vehicle for transmitting energy from said vehicle drive wheel means and into said flywheel as to thereby impart rotation to said flywheel, said secondary power transmitting means being effective during a second condition of operation of said vehicle for transmitting energy from said flywheel during its rotation and into said drive wheel means as to at least assist in propelling said vehicle, said secondary power transmitting means comprising a first secondary drive train and a second secondary drive train in mechanically parallel relationship to each other, said first secondary drive train comprising first and second clutch means, said first clutch means being effective for preventing the transmission of a working torque therethrough except in a first direction of transmission, said second clutch means being effective to vary the magnitude of said working torque transmitted through said first clutch means in said first direction, said second secondary drive train comprising third and fourth clutch means, said third clutch means being effective for preventing the transmission of a working torque therethrough except in a second direction of transmission opposite to said first direction, and said fourth clutch means being effective to vary the magnitude of said working torque transmitted through said third clutch means in said second direction.

8. An energy storing and supplying system according to claim 7 wherein said first and third clutch means each comprise an over-running on-way clutch assembly, and wherein said second and fourth clutch means each comprise an electro-magnetic clutch assembly.

9. An energy storing and supplying system according to claim 8 wherein said first secondary drive train comprises first and second gear means respectively operatively connected at first and second opposite effective ends thereof, wherein said second secondary drive train comprises third and fourth gear means respectively operatively connected at third and fourth opposite effective ends thereof, wherein said first and third gear means are in meshed engagement with fifth gear means operatively connected to said primary power transmitting means and said drive wheel means, and wherein said second and fourth gear means are in meshed engagement with sixth gear means operatively connected to said flywheel.

10. An energy storing and supplying system according to claim 9 wherein said primary power transmitting means comprises a variable speed transmission assembly, drive shaft means operatively coupled to said transmission assembly and to differential gearing means, and wherein said fifth gear means is connected to said drive wheel means by operative connection to said transmission assembly.

11. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said secondary power transmitting means being effective during a first condition of operation of said vehicle for transmitting energy from said vehicle drive wheel means and into said flywheel as to thereby impart rotation to said flywheel, said secondary power transmitting means being effective during a second condition of operation of said vehicle for transmitting energy from said flywheel during its rotation and into said drive wheel means as to at least assist in propelling said vehicle, said secondary power transmitting means comprising a first secondary drive train and a second secondary drive train, said first secondary drive train comprising first and second clutch means, said first clutch means being effective for preventing the transmission of a working torque therethrough except in a first direction of transmission, and said second clutch means being effective to vary the magnitude of said working torque transmitted through said first clutch means in said first direction, said first secondary drive train comprising first and second gear means respectively operatively connected at first and second opposite effective ends thereof, said second secondary drive train comprising third and fourth gear means respectively operatively connected at third and fourth opposite effective ends thereof, said first and third gear means being in operative engagement with fifth gear means in turn operatively connected to said primary power transmitting means and said drive wheel means, and said second and fourth gear means being in operative engagement with sixth gear means in turn operatively connected to said flywheel.

12. An energy storing and supplying system according to claim 11 wherein said primary power transmitting means comprises a variable speed transmission assembly, drive shaft means operatively coupled to said transmission assembly and to differential gearing means, and wherein said fifth gear means is connected to said drive wheel means by operative connection to said transmission assembly.

13. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said secondary power transmitting means being effective during a first condition of operation of said vehicle for transmitting energy from said vehicle drive wheel means and into said flywheel as to thereby impart rotation to said flywheel, said secondary power transmitting means being effective during a second condition of operation of said vehicle for transmitting energy from said flywheel during its rotation and into said drive wheel means as to at least assist in propelling said vehicle, said secondary power transmitting means comprising a first secondary drive train and a second secondary drive train, said first secondary drive train comprising first and second clutch means, said first clutch means being effective for preventing the transmission of a working torque therethrough except in a first direction of transmission, said second clutch means being effective to vary the magnitude of said working torque transmitted through said first clutch means in said first direction, said second secondary drive train comprising third and fourth clutch means, said third clutch means being effective for preventing the transmission of a working torque therethrough except in a second direction of transmission opposite to said first direction, said fourth clutch means being effective to vary the magnitude of said working torque transmitted through said third clutch means in said second direction, said first and third clutch means each comprising an over-running one-way clutch assembly, and said second and fourth clutch means each comprising an electro-magnetic clutch assembly.

14. An energy storing and supplying system according to claim 13 wherein said first secondary drive train comprises first and second gear means respectively operatively connected at first and second opposite effective ends thereof, wherein said second secondary drive train comprises third and fourth gear means respectively operatively connected at third and fourth opposite effective ends thereof, wherein said first and third gear means are operatively connected to fifth gear means in turn operatively connected to said primary power transmitting means and said drive wheel means, and wherein said second and fourth gear means are operatively connected to sixth gear means in turn operatively connected to said flywheel.

15. An energy storing and supplying system according to claim 13 wherein said primary power transmitting means comprises a variable speed transmission assembly, drive shaft means operatively coupled to said transmission assembly and to differential gearing means, and wherein said fifth gear means is connected to said drive wheel means by operative connection to said transmission assembly.

16. An energy storing and supplying system according to claim 14 wherein said primary power transmitting means comprises a variable speed transmission assembly, drive shaft means operatively coupled to said transmission assembly and to differential gearing means, and wherein said fifth gear means is connected to said drive wheel means by operative connection to said transmission assembly.

* * * * *